April 7, 1970  H. R. FLETCHER ET AL  3,504,725
VEHICLE WHEEL ASSEMBLIES
Filed Nov. 7, 1967

INVENTORS
HENRY RAYMOND FLETCHER
GLYN BENBOW ROBERTS
By Rauber & Lazar
ATTORNEYS United States Patent Office 3,504,725
Patented Apr. 7, 1970

3,504,725
VEHICLE WHEEL ASSEMBLIES
Henry Raymond Fletcher, Ward End, Birmingham, and Glyn Benbow Roberts, Sutton Coldfield, England, assignors to The Dunlop Company Limited, London, England, a British company
Filed Nov. 7, 1967, Ser. No. 681,254
Claims priority, application Great Britain, Nov. 15, 1966, 51,116/66
Int. Cl. B60b *21/12*
U.S. Cl. 152—362         9 Claims

ABSTRACT OF THE DISCLOSURE

A vehicle wheel and tyre asembly having a bent transmission barrier interposed between the wheel rim and the tyre to prevent heat from the brake from being transmitted to the tyre and causing premature failure. It may be secured to or formed as part of either the wheel rim or the tyre bead region, or it may be a device separate from both wheel and tyre.

---

This invention relates to a vehicle wheel assembly of the type adapted to carry a pneumatic tyre mounted thereon and the invention relates in particular to an aircraft or other high speed vehicle wheel assembly.

An aircraft wheel assembly comprises a pair of axially-spaced apart wheel flanges having a bead-seating well defined in between them for receiving the bead portions of a pneumatic tyre mounted upon the wheel. Radially inwardly of the well there is located a brake pack assembly which generally comprises a plurality of fixed discs located in side-by-side relationship with a plurality of discs fixed to and rotatable with the wheel, axial pressure being applicable to the discs to effect braking of the wheel. Such braking as occurs for example during the landing or taxying of the aircraft, causes rapid build-up of heat in the brake pack and this heat is transmitted by convection, radiation and conduction to the wheel rim itself. Consequently, the temperature of the bead regions of the tyre is raised to an undesirably high level and this elevated temperature can lead to a reduction in the fatigue life of the bead regions of the tyre and thereby reduce the permissible operational life of the tyre.

According to the invention a vehicle wheel and tyre assembly comprises a heat transmission barrier interposed between a bead-seating portion of the wheel and the opposed bead region of the tyre, the heat transmissibility of the said barrier being substantially less than that of the bead-seating portion of the wheel so as to limit the amount of heat transmitted from the wheel to the tyre.

The said barrier may be secured to either the bead-seating portion of the wheel or to the opposed bead region of the tyre.

Preferably the barrier comprises, at least in part, air or other heat insulating material for the reduction of heat transmission from the wheel to the tyre by conduction. However, it may comprise, again at least in part, a reflective component for the reduction of heat transmission by radiation.

Also according to the invention there is provided a heat transmission barrier for use in a vehicle wheel and tyre assembly.

Various embodiments of the invention will now be described by way of example with reference to the accompanying drawings, of which:

Figure 1:
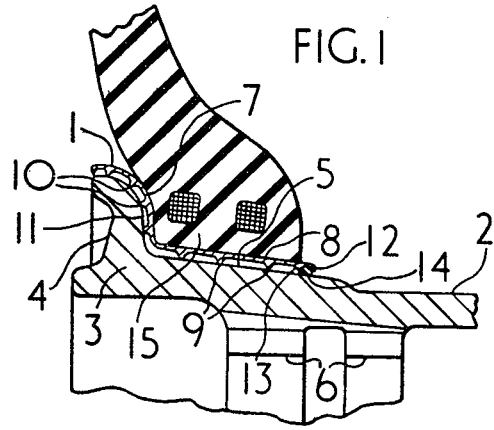
FIGURE 1 is a transverse cross-section through part of a wheel rim, a tyre bead region and an annular device according to a first embodiment of the invention.

The first embodiment of the invention (shown in FIGURE 1) comprises an annular device 1 intended for use with an aircraft wheel assembly 2 of known construction, the rim 3 of which comprises two radially-outwardly extending axially-spaced-apart flanges 4 defining a bead-seating well in between them, said well comprising two bead-seating surfaces 5 which extend axially inwardly from the flanges and are tapered slightly so as to extend slightly radially-inwardly. In this construction a plurality of radially-inwardly extending annular discs (not shown) are fixedly secured to driving dogs 6 located on the radially-inner surface of the well and are located in side-by-side relationship with a further plurality of annular discs (not shown) which are fixedly secured within a brake pack (not shown) secured to a stationary part of the aircraft. Axial pressure exerted upon the discs causes frictional engagement between the fixed and rotatable discs to effect braking of the wheel assembly.

Two devices 1 are provided each one of which is locatable upon a bead-seating surface 5 of the wheel. Each such device comprises an annular stainless steel shell of a cross-sectional form corresponding to the profile of the adjacent part of the flange 4 and bead-seating region 5 of the wheel, i.e. each shell comprises an axially-outer radially-outwardly extending flange 7 and an integral axially-inwardly extending surface 8 which is also inclined slightly radially-inwardly.

A plurality of radially-inwardly extending projections 9 in the form of blunt spikes are provided on the shell 1, the radially-inner surfaces of such spikes lying on an imaginary frusto-conical surface and being adapted all to engage with the corresponding bead-seating surface 5 of the well of the wheel. A plurality of axially-outwardly extending similar spikes 10 are formed on the flange region 7 of the shell to engage with the axially-inner surface 11 of the wheel flange.

The axially-inner edge of the shell is curved radially-inwardly to form a circumferentially extending lip 12. Located axially-outwardly a short distance from this lip on the radially-inner surface of the shell is a circumferentially extending rib 13. The rib and lip hold a rubber sealing ring 14 against the bead-seating surface 5 of the wheel to prevent air escaping from the tubeless tyre mounted on the wheel to the atmosphere between the shell and the bead-seating surface.

Thus when two shells are located upon the corresponding bead-seating surfaces 5 of the wheel the radially-outer surface 8 of each shell, upon which a corresponding bead region 15 of the tyre is mountable, is spaced away from the bead-seating surface 5 of the wheel. The space defined between the shell 1 and the bead-seating surface 5 of the wheel comprises a region containing a heat-insulating material which in this construction comprises air, heat conduction being possible only along the shell spikes 9 and 10, which have minimal contact with the bead-seating surface 5 and the axially-inner surface 11 of the flange 4.

In an alternative construction (not shown) each shell is of construction similar to that hereinbefore described, but the aforesaid space between the shell and the bead-seating region of the wheel is filled with asbestos or other heat-insulating material, which may itself be bonded to the metal surfaces of the shell. Of known insulators which may be used, the most suitable are those which are readily formable and not deleteriously affected by heat.

It will be appreciated that in either of the above constructions the shell itself may be formed of material other than stainless steel for example, each shell may be constructed of a light-weight metal alloy. It will also be appreciated that other forms of projections e.g. narrow ribs, may be formed on the shell to space it from the wheel.

Figure 2:
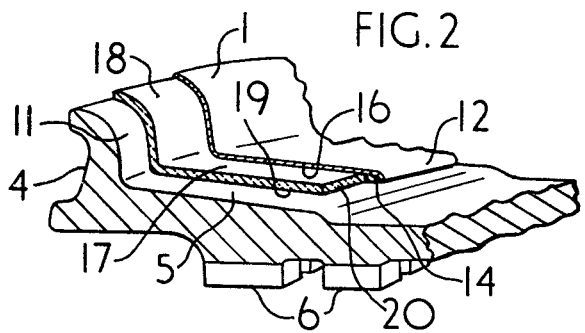
FIGURE 2 is a cut-away perspective view of part of a wheel rim and device showing an alternative construction of the first embodiment.

In a further alternative construction shown in FIGURE 2 wherein similar reference numerals are used for parts similar to the construction in FIGURE 1 the annular metal shell 1 is devoid of locating spikes, the radially-inner surface 16 of each shell being engageable with the radially-outer surface 17 of the annular heat-insulating element 18 proper and the radially-inner surface 19 of each element being locatable upon the bead-seating surface 5 of the wheel. The radially-outer metal shell may in this construction be separate from or bonded to the heat-insulating element proper, such element 18 preferably comprising asbestos slate. The shell is also devoid of a circumferentially extending rib for the seal 14, which in this construction is held between the lip 12 on the shell and the axially-inner edge 20 of the element 18.

In all of the aforementioned constructions if the radially-inner surface of the metal shell is highly polished a reduction of heat transmission by radiation to the bead region will occur due to reflection.

In a further alternative construction (not shown) each heat-insulating annular element is of the same general configuration to that hereinbefore described but is formed wholly of asbestos slate, the metal shell being omitted. In such a construction the element is thicker than the metal shell hereinbefore described and is not formed with any locating spikes, the radially-inner surface of the element being of a corresponding configuration to that of the bead-seating surface and flange of the wheel and being adapted to fit in close contact therewith.

In any of the preceding three alternative constructions each such annular asbestos element is of the order of 0.1 to 0.2 inch in thickness and may, if desired, be bonded to the bead-seating surface and flange of the wheel to form an integral part therewith.

Figures 3, 4:
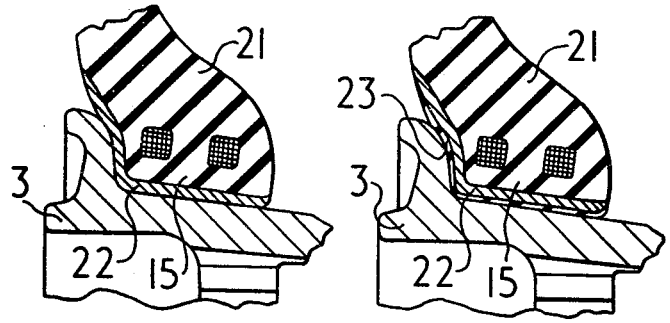
FIGURE 3 is a transverse cross-section through part of a wheel rim and a tyre bead region with a barrier bonded to the tyre according to a second embodiment of the invention.
FIGURE 4 is a transverse cross-section through part of a wheel rim and a tyre bead region with a barrier integrally formed with the tyre according to a modification of the second embodiment.

In a second embodiment of the invention shown in FIGURE 3 wherein similar reference numerals refer to similar parts in FIGURES 1 and 2, a tyre 21 has a heat-insulating barrier 22 bonded to the bead region 15 over the whole of the area of contact of the tyre with the wheel rim 3. The bond may be achieved either during or after manufacture of the tyre.

In an alternative construction (shown in FIGURE 4) of the second embodiment wherein similar reference numerals again refer to similar parts in FIGURES 1 to 3, the heat-insulating barrier 22 is integrally formed with the bead region 15 during the tyre building process by building it on to the raw tyre carcass, placing over it a layer of unvulcanized heat-resisting rubber or rubber-like compound and subsequently moulding and vulcanizing the complete tyre. This layer 23 is then in direct contact with the wheel rim 3.

In either of the constructions shown in FIGURES 3 or 4 a rigid metal or metal mesh layer may be sandwiched between the tyre bead region 15 and the heat-insulating barrier 22 to reduce the tensile stresses in the insulating barrier, and protect it during any moulding process it may undergo.

Thus in all the forms of heat-insulating barriers hereinbefore described the transmission of heat to the bead regions of a tyre mounted upon a wheel is considerably reduced. This reduction of heat transmission to the tyre bead regions not only prolongs the permissible operational life of the tyre but also permits an increased frequency of use of an aircraft to which such heat insulating barriers are fitted.

For example it is known that although the actual braking time of an aircraft wheel upon landing may be small the heat generated by the braking action is large and temperature build-up due to heat dissipation continues in the outer regions of the brake pack for a considerable time after the brakes have been dis-engaged and the wheel has come to rest. Wheel rim temperatures as a result of the braking action may rise to 200° C. and may still be rising some 20 minutes or more after the wheel has come to rest. The cooling time of the wheel rim is longer than the heat build-up time (dependent upon the ambient temperature) and as much as two hours duration of time may ensue before the wheel rim temperature and hence the tyre bead region temperature has fallen to a safe level at which the physical characteristics of the bead region will not be affected.

The provision of heat-insulating barriers constructed in accordance with the invention reduces the maximum temperature to which the tyre bead regions can rise after the braking of the wheel. Consequently the cooling time of the tyre bead regions to their permissible maximum temperature is reduced and the "turn around" time of the aircraft is also reduced thus resulting in a better operating efficiency of the aircraft in terms of time.

Having now described our invention, what we claim is:

1. A vehicle wheel having a bead-seating portion for the bead region of a tyre wherein the improvement comprises the provision of a heat transmission barrier located on said portion, so as to be interposed between said portion and the bead region of a tyre when located on the wheel, the heat transmissibility of the barrier being substantially less than that of the bead-seating portion, so as to limit the amount of heat transmitted from the wheel to the tyre, said barrier comprising an annular metal shell formed substantially to correspond with the shape of the bead-seating portion of the wheel, a plurality of projections being provided on the radially inner surface of the shell for supporting the shell on the portion and for forming a space between the shell and the portion.

2. A vehicle wheel according to claim 1, wherein said projections are spikes.

3. A vehicle wheel according to claim 1, wherein said projections are ribs.

4. A vehicle wheel according to claim 1, wherein said space is filled with asbestos material.

5. A vehicle wheel according to claim 1, wherein a rubber sealing ring is provided between the bead-seating portion and the radially-inner surface of the shell adjacent to the axially inner edge of the shell, for the prevention of air escape from an inflated tyre mounted on the wheel.

6. A vehicle wheel according to claim 1, wherein the radially-inner surface of the shell is reflective.

7. A vehicle wheel having a bead-seating portion for the bead region of a tyre wherein the improvement comprises the provision of a heat transmission barrier located on said portion, so as to be interposed between said portion and the bead region of a tyre when located on the wheel, the heat transmissibility of the barrier being substantially less than that of the bead-seating portion so as to limit the amount of heat transmitted from the wheel to the tyre, said barrier comprising an annular metal shell formed substantially to correspond with the shape of the bead-seating portion of the wheel and a layer of asbestos material interposed between the shell and the bead-seating portion.

8. A vehicle wheel according to claim 7, wherein a rubber sealing ring is provided between the bead-seating portion and the radially inner surface of the shell adjacent to the axially inner edge of the shell, for the prevention of air escape from an inflated tyre mounted on the wheel.

9. A vehicle wheel according to claim 7, wherein the radially inner surface of the shell is reflective.

References Cited

UNITED STATES PATENTS

| | | | |
|---|---|---|---|
| 1,239,506 | 9/1917 | Moore | 152—366 |
| 2,563,787 | 8/1951 | Keefe | 152—362 |
| 2,913,034 | 11/1959 | Wall | 152—366 |
| 3,101,110 | 8/1963 | Vandenberg | 152—357 |
| 3,130,965 | 4/1964 | Niclas | 152—362 |

FOREIGN PATENTS

| | | |
|---|---|---|
| 69,919 | 9/1949 | Denmark. |
| 1,168,154 | 12/1958 | France. |
| 1,434,207 | 4/1966 | France. |
| 570,919 | 7/1945 | Great Britain. |

ARTHUR L. LA POINT, Primary Examiner

C. B. LYON, Assistant Examiner

U.S. Cl. X.R.

152—366